United States Patent
Abromaitis

(10) Patent No.: US 6,505,810 B2
(45) Date of Patent: Jan. 14, 2003

(54) PINCH VALVE ARRANGEMENT FOR FLOW CONTROL

(76) Inventor: Andre T. Abromaitis, 7404 Kniffen Rd., Painesville, OH (US) 44077-8856

( * ) Notice: Subject to any disclaimer, the term of this patent is extended or adjusted under 35 U.S.C. 154(b) by 0 days.

(21) Appl. No.: 09/887,532

(22) Filed: Jun. 22, 2001

(65) Prior Publication Data

US 2002/0014607 A1 Feb. 7, 2002

Related U.S. Application Data

(60) Provisional application No. 60/213,311, filed on Jun. 22, 2000.

(51) Int. Cl.$^7$ ................................................. F16K 7/04
(52) U.S. Cl. .......................... 251/7; 251/4; 251/5; 251/6
(58) Field of Search ................................ 251/4, 5, 6, 7, 251/8, 123, 124

(56) References Cited

U.S. PATENT DOCUMENTS

| | | | | | |
|---|---|---|---|---|---|
| 3,086,797 A | * | 4/1963 | Webb | ........................... | 285/242 |
| 3,920,215 A | * | 11/1975 | Knauf | ........................... | 251/7 |
| 3,955,594 A | * | 5/1976 | Snow | ........................... | 137/493 |
| 3,984,080 A | * | 10/1976 | Varis et al. | ........................... | 251/5 |
| 4,073,467 A | * | 2/1978 | Little et al. | ........................... | 251/7 |
| 4,322,054 A | * | 3/1982 | Campbell | ........................... | 251/5 |
| 4,372,528 A | * | 2/1983 | Raftis | ........................... | 251/4 |
| 4,518,145 A | * | 5/1985 | Keltz et al. | ........................... | 251/5 |
| 4,569,502 A | * | 2/1986 | Elliott | ........................... | 251/8 |
| 4,682,755 A | * | 7/1987 | Bernstein et al. | ........................... | 251/4 |
| 4,802,650 A | * | 2/1989 | Stricker | ........................... | 251/117 |
| 4,895,341 A | * | 1/1990 | Brown et al. | ........................... | 251/8 |
| 4,899,783 A | * | 2/1990 | Yusko, Jr. et al. | ........................... | 137/556 |
| 5,253,704 A | * | 10/1993 | Barrus et al. | ........................... | 166/53 |
| 5,402,823 A | | 4/1995 | Cole | ........................... | 137/594 |
| 5,441,231 A | * | 8/1995 | Payne et al. | ........................... | 251/5 |
| 5,549,793 A | * | 8/1996 | Hellstrom et al. | ........................... | 162/258 |
| 5,657,960 A | | 8/1997 | Taylor | ........................... | 251/7 |
| 5,992,818 A | | 11/1999 | Jones et al. | ........................... | 251/7 |
| 6,241,485 B1 | * | 6/2001 | Warwick | ........................... | 417/300 |

FOREIGN PATENT DOCUMENTS

JP 58-046271 * 3/1983 ............. F16K/7/06

* cited by examiner

Primary Examiner—Henry C. Yuen
Assistant Examiner—Frederick C. Nicolas

(57) ABSTRACT

The present invention is a pinch valve for connection between an upstream pipeline and a downstream pipeline. The pinch valve includes a fixed conical reducer having an inlet end, an outlet end and an inside surface with an inside diameter which gradually reduces from the inlet end to the outlet end, resulting in a substantially conical-shaped inside surface. The inlet end of the fixed conical reducer attached to the upstream pipeline. The pinch valve also includes a flexible full port sleeve having an inlet end and an outlet end, the inlet end of the flexible full port sleeve attached to the outlet end of the fixed conical reducer and the outlet end of the full port sleeve attached to the downstream pipeline. The pinch valve further includes a pinching mechanism positioned adjacent the flexible full port sleeve and configured to constrict the flexible full port sleeve.

5 Claims, 3 Drawing Sheets

PINCH VALVE ARRANGEMENT FOR FLOW CONTROL

CROSS-REFERENCE TO RELATED APPLICATION

This application claims the benefit of earlier filed U.S. Provisional Patent Application Ser. No. 60/213,311, filed Jun. 22, 2000, entitled "Pinch Valve Arrangement For Flow Control".

BACKGROUND OF THE INVENTION

1. Field of the Invention

The present invention relates to valves, and in particular, this invention relates to a pinch valve arrangement and piping system for flow control.

2. Description Prior Art

A pinch valve is essentially a flow control system with a flexible tubular conduit or sleeve connecting two sections of a piping system. This flexible tubular conduit is adapted to allow its sides to be pinched inward, reducing flow through the conduit. In this manner, a pinch valve sleeve effectively controls the flow of material through the valve and associated piping system.

Typical pinch valve sleeves are manufactured in many configurations, e.g., full port, cone, etc. Full port sleeves are the simplest to manufacture and in the fully open position provide an unobstructive passage equal to the full pipe diameter. However, when the port sleeve is throttled or pinched, due to the streamline shape of the sleeve, the throttled full port sleeve will cavitate at a relatively low-pressure drop across the valve. As the full port sleeve is a "high recovery" sleeve, it operates similar to a venturi.

As demonstrated in U.S. Pat. No. 5,992,818 to Jones et al., the flexible tubular conduit is centrally pinched in order to control flow through the elastic sleeve and into the remainder of the piping system. Similarly, U.S. Pat. No. 5,657,960 to Taylor illustrates the various devices that may be used to constrict or pinch the flexible sleeve. Further, as seen in U.S. Pat. No. 5,402,823 to Cole, a valve lever may be used to manually pinch the sleeve and restrict the flow therethrough.

In another typical pinch valve system, a flexible cone sleeve is utilized to control the flow of material through the valve. Basically, the flexible cone sleeve uses a gradually reduced-diameter cone on the inlet side of the flexible sleeve. Because of the additional turbulence generated at the downstream exit, the flexible cone sleeve arrangement has lower pressure recovery and allows a larger pressure drop across the valve before cavitation and cavitation damage occurs. For throttling or pinching service, it is common practice to use a valve body diameter equal to the pipeline diameter with a flexible cone sleeve selected to minimize cavitation yet still pass the required flow at the available pressure drop. For example, with a 36-inch line, the valve body would fit a 36-inch valve and the flexible cone sleeve may be 36 inches by 24 inches. In this example, the body, the mechanism, the actuator and sleeve are sized and designed accordingly.

While all of the prior art systems have the ability to control material flow through the valve body utilizing a pinching arrangement, the manufacturing cost and associated flow characteristics require significant improvement. Further, the full port sleeves cavitate at a relatively low pressure, necessitating maintenance, repair or replacement. Therefore, it is another object of the present invention to provide a pinch valve arrangement which prevents such cavitation and may be manufactured at a fraction of the cost of prior art systems.

SUMMARY OF THE INVENTION

The present invention is a pinch valve arrangement with primary application in the area of large diameter piping systems. The present invention includes a fixed conical reducer with an inlet end, an outlet end and an inside surface. The inside diameter of the inside surface gradually reduces from the inlet end to the outlet end of the fixed conical reducer, resulting in a conical-shaped inside surface. The inlet end of the fixed conical reducer is attached to an upstream pipeline. The pinch valve also includes a flexible full port sleeve with an inlet end and an outlet end; the inlet end attached to the fixed conical reducer outlet end, and the outlet end attached to the downstream pipeline. In a preferred embodiment, the outlet end of the full port sleeve is secured to a reducing flange, which, in turn, is secured to the inlet end of the downstream pipeline. Further, the present invention includes a pinching mechanism, i.e., an upper and lower pinch bar, for pinching or throttling the flexible full port sleeve.

In operation, the forward flow of fluid through the upstream pipeline is restricted in the fixed conical reducer before entering the flexible full port sleeve. As the diameter of the fixed conical reducer gradually decreases, the flow of material through the system is restricted. At the exit of the fixed conical reducer, the material enters the full port sleeve, and thereafter exits the system through a downstream pipeline. However, if the flexible full port sleeve is partially closed or pinched, the material flow is further restricted and controlled prior to its exit from the flexible full port sleeve into the downstream pipeline.

The invention itself, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
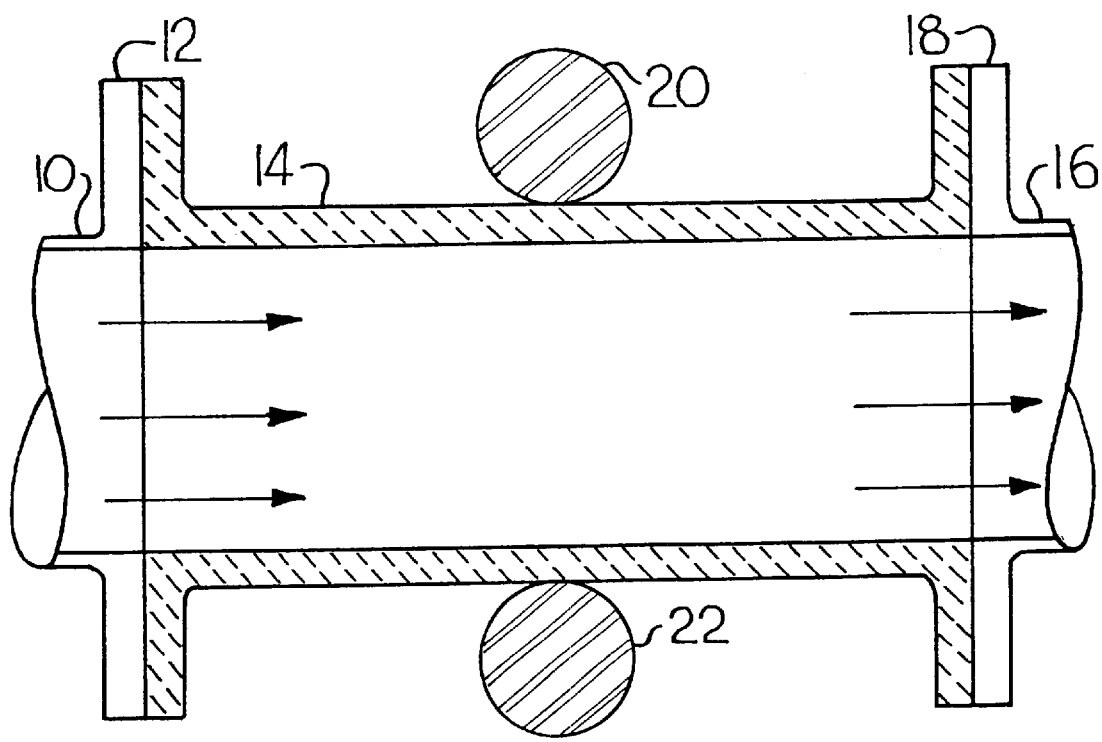
FIG. 1 is a side sectional view of a fully open full port sleeve according to the prior art.
Figure 2:
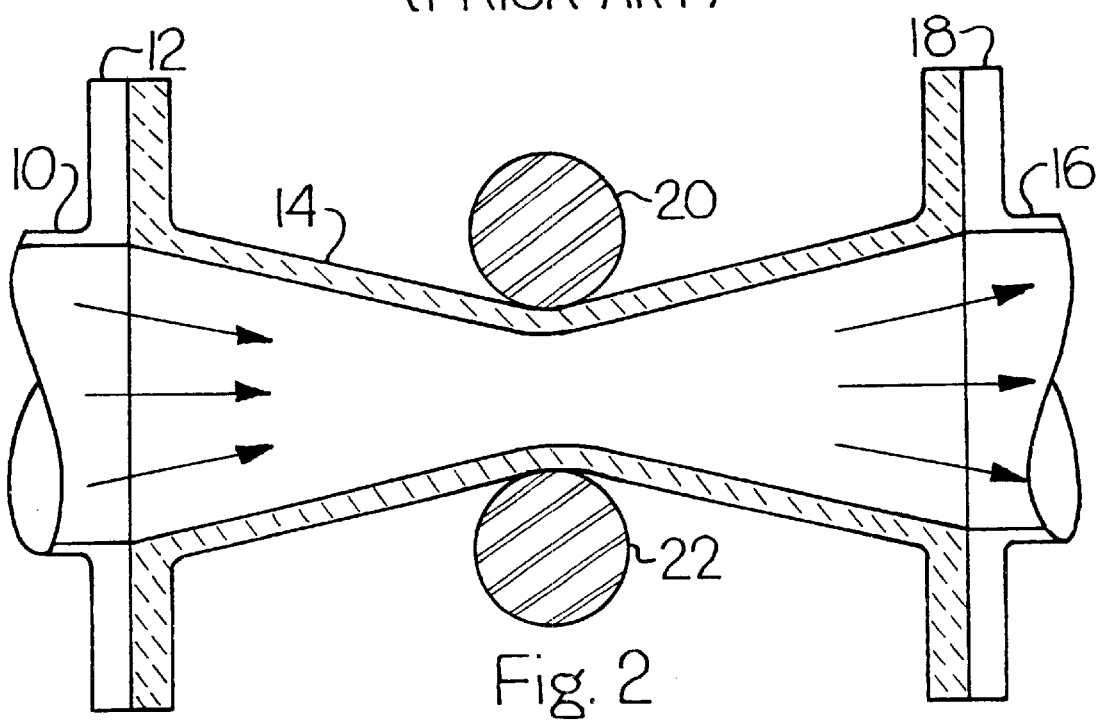
FIG. 2 is a side sectional view of a partially closed full port sleeve according to the prior art.

As illustrated in FIGS. 1 and 2 and according to the prior art, a full port assembly includes an upstream pipeline 10 with an upstream pipeline flange 12 connected to a flexible full port sleeve 14 at a first end of the sleeve 14. In addition, a second end of the flexible full port sleeve 14 is connected to a downstream pipeline 16 via a downstream pipeline flange 18. Further, the full port assembly includes a pinching mechanism, which may consist of an upper pinch bar 20 and a lower pinch bar 22. As shown in FIG. 2, in operation, the upper pinch bar 20 and the lower pinch bar 22 throttle or constrict material flow through the flexible full port sleeve 14, thereby restricting flow through the flexible full port sleeve 14. This operation controls flow through the system.

Figure 3:
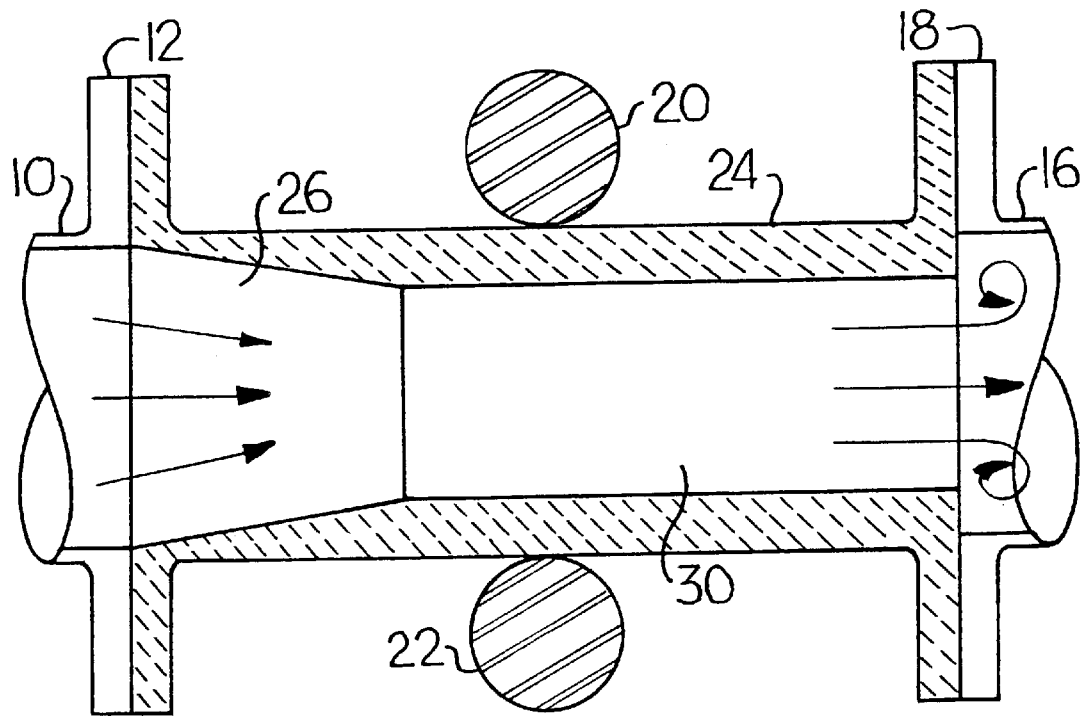
FIG. 3 is a side sectional view of a fully open cone sleeve according to the prior art.
Figure 4:
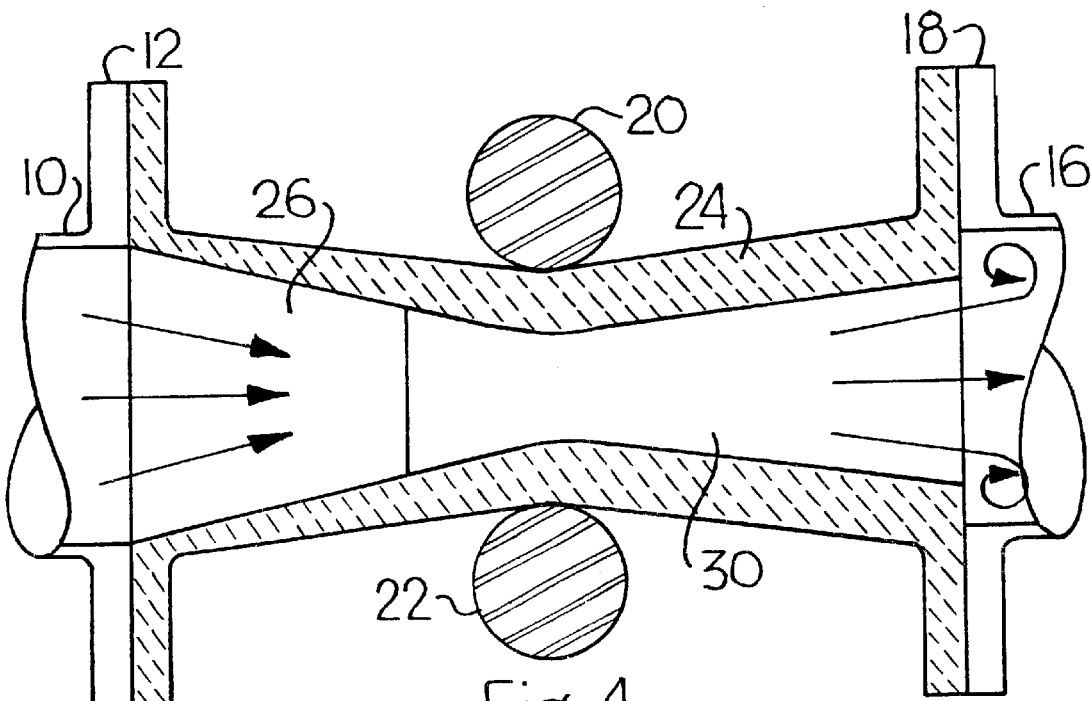
FIG. 4 is a side sectional view of a partially closed cone sleeve according to the prior art.

Turning to FIGS. 3 and 4, also according to the prior art, material flow is controllable by a cone sleeve assembly. As with the full port sleeve assembly discussed above, the cone sleeve assembly also includes the upstream pipeline 10 with the upstream pipeline flange 12, the downstream pipeline 16 with the downstream pipeline flange 18, the upper pinch bar 20 and the lower pinch bar 22. However, the cone sleeve assembly uses a flexible cone sleeve 24 connected to the upstream pipeline 10 and downstream pipeline 16 via the upstream pipeline flange 12 and the downstream pipeline flange 18. The flexible cone sleeve 24 is manufactured so that a first end of the flexible cone sleeve 24 is equal in diameter to the upstream pipeline 10. The flexible cone sleeve 24 gradually reduces diameter, creating a cone portion 26 which serves to initially restrict material flow through the flexible cone sleeve 24. Immediately following the cone portion 26 of the flexible cone sleeve 24 is a straight portion 30 which mirrors the flexible full port sleeve 14 discussed above. The second end of the straight portion 30 (or flexible cone sleeve 24) has a diameter smaller than the diameter of the downstream pipeline 16. This difference in diameter results in a pressure drop, caused by energy loss at the juncture. As seen in FIG. 4, in operation, the upper pinch bar 20 and the lower pinch bar 22 further constrict the flexible cone sleeve 24 at a central location, allowing material flow control through the flexible cone assembly.

Figure 5:
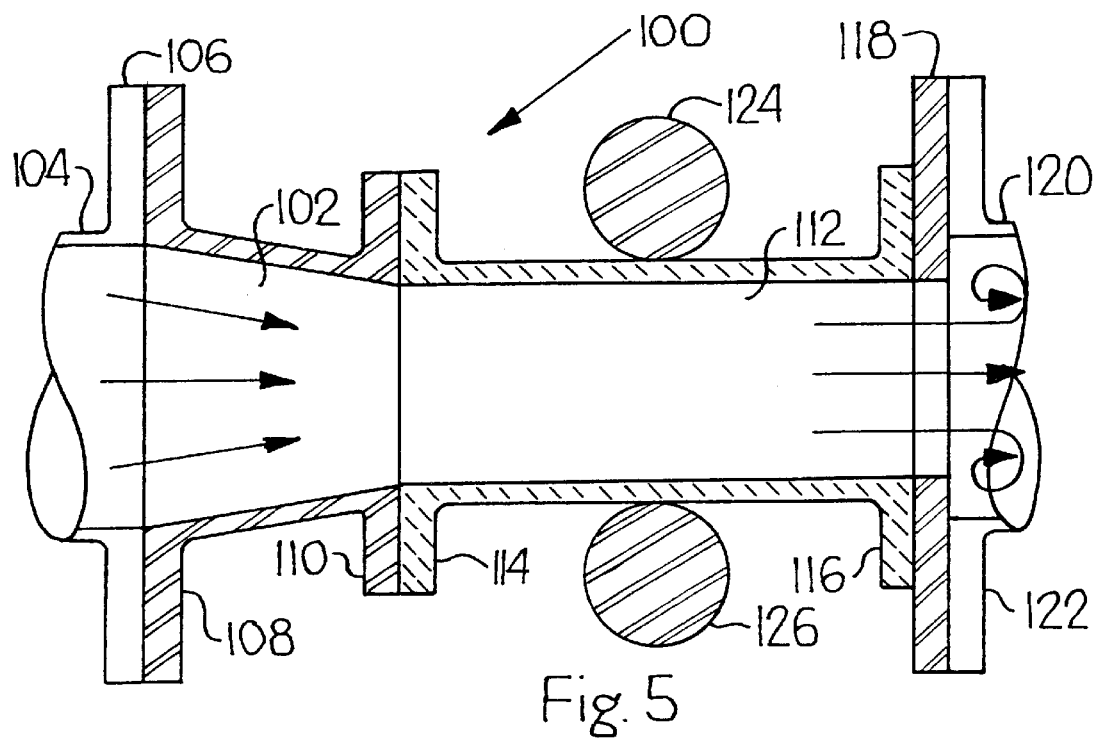
FIG. 5 is a side sectional view of an embodiment of the present invention in a fully open position.
Figure 6:
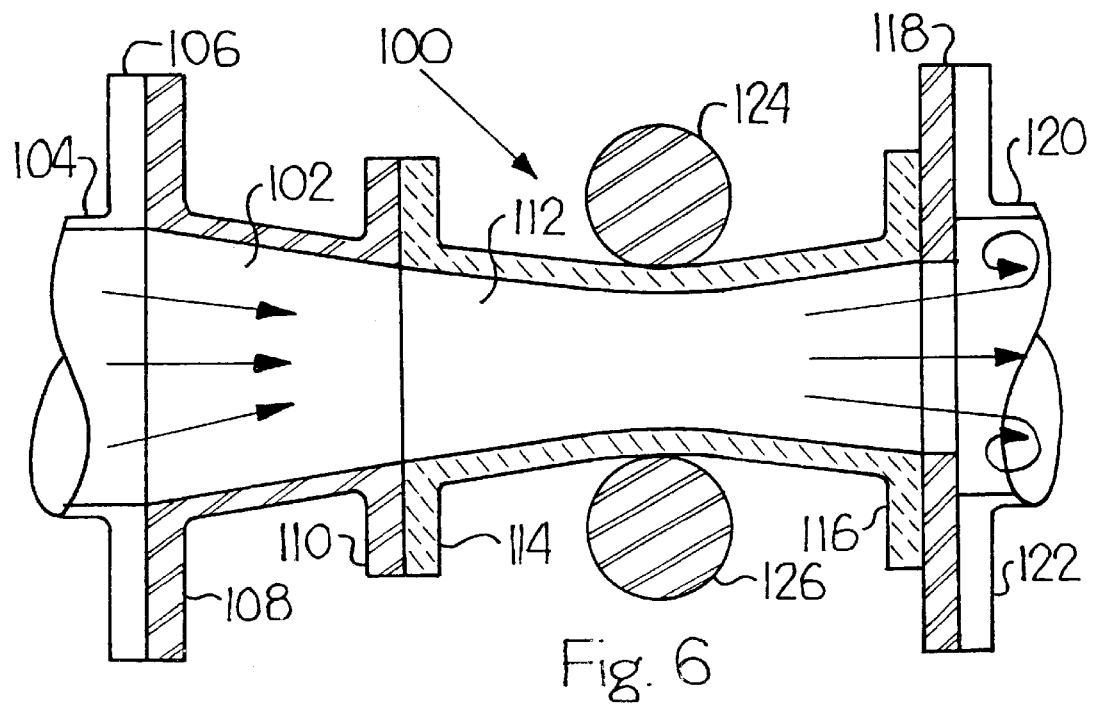
FIG. 6 is a side sectional view of the embodiment of FIG. 1 in a partially closed position.

The present invention is a pinch valve arrangement 100 as shown in FIGS. 5 and 6 and includes a fixed conical reducer 102 connected to an upstream pipeline 104 via an upstream pipeline flange 106 at an inlet end 108 of the fixed conical reducer 102. An outlet end 110 of the fixed conical reducer 102 is connected to a flexible full port sleeve 112 at an inlet end 114 of the flexible full port sleeve 112. An outlet end 116 of the flexible full port sleeve 112 is connected to a reducing flange 118 which, in turn, is connected to a downstream pipeline 120 via a downstream pipeline flange 122. Further, the present invention 100 includes a pinching mechanism, which may consist of an upper pinch bar 124 and a lower pinch bar 126. It is envisioned that the pinching mechanism may use direct-acting air pressure or any other pinching structure or movement.

The fixed conical reducer 102 is formed from a rigid material, such as carbon steel or stainless steel. The inside diameter of the inlet end 108 of the fixed conical reducer 102 is equal to the inside diameter of the upstream pipeline 104, providing smooth transition of the material flow through the upstream pipeline 104 and into the fixed conical reducer 102. The inside diameter of the fixed conical reducer 102 gradually reduces, resulting in a predetermined smaller inside diameter at the outlet end 110 of the fixed conical reducer 102. The flexible full port sleeve 112 is constructed of a durable, yet flexible material, such as rubber or other elastomeric material. The inlet end 114 of the flexible full port sleeve 112 has an inside diameter equal to the outlet end 110 of the fixed conical reducer 102. In addition, the flexible full port sleeve 112 maintains that inside diameter through the flexible full port sleeve 112 such that the outlet end 116 of the flexible full port sleeve 112 is equal in its inside diameter to the inlet end 114 of the flexible full port sleeve 112.

According to a presently preferred embodiment of the invention 100, a reducing flange 118 is provided, where the reducing flange 118 has an inside diameter equal to the flexible full port sleeve 112. As installed, the outlet end 116 of the flexible full port sleeve 112 is connected to the reducing flange 118 which, in turn is connected to the downstream pipeline 120 via the downstream pipeline flange 122. It should be noted that, as in the prior art applications, the upper pinch bar 124 and the lower pinch bar 126 are centrally located around the flexible full port sleeve 112.

Turning to FIG. 6, in operation, the pinch valve arrangement 100 utilizes a pinching mechanism so that the upper pinch bar 124 and the lower pinch bar 126 constrict the flexible full port sleeve 112 at its central location. As the fixed conical reducer 102 is manufactured from a rigid material, there is no flex or movement anywhere along the fixed conical reducer 102. As material flows through the upstream pipeline 104 and into the fixed conical reducer 102, the flow of the material is restricted, as the inside diameter of the fixed conical reducer 102 reduces from the first end 108 to the second end 110. At this point, the material enters the flexible full port sleeve 112 at the inlet end 114, and is further constricted due to the operational pinch state of the upper pinch bar 124 and the lower pinch bar 126. As the material flows through the flexible full port sleeve 112 and out of the outlet end 116, the material or fluid passes through the reducing flange 118 and into the downstream pipeline 120. As designed, the use of this pinch valve arrangement 100 generates turbulence and pressure loss at the entry of the downstream pipeline 120. This, in turn, provides back pressure to the valve and reduces cavitation in the valve.

Using a 36-inch line, for example, the fixed conical reducer 102 would be sized to 36 inches by 24 inches. The valve would have a 24-inch body (not shown) and the flexible full port sleeve 112 would have a 24-inch inside diameter. It is also envisioned that the valve would have an appropriately sized actuator. The reducing flange 118 connected to the downstream pipeline 120 would be sized to 24 inches by 36 inches. Overall, the flow characteristics and control characteristics of this configuration are nearly identical to those of the flexible cone sleeve assembly with the same valve dimensions, according to the prior art. Importantly however, for a given pipeline diameter the cost of the pinch valve arrangement 100 is substantially less (approximately 50% less) than that of the flexible cone sleeve assembly of the prior art, illustrated in FIGS. 3 and 4.

The present invention 100 should not be confused with the common practice of using a conical reducer to join a pipeline to a smaller-than-line size valve and then a conical expander to join the outlet of the valve to a larger pipeline. However, when a conical expander is used, the purpose of the expander is to minimize turbulence and pressure loss at the exit of the valve. In the present invention 100, a reducing flange 118, used in conjunction with the flexible full port sleeve 112 and the fixed conical reducer 102, is utilized to generate additional turbulence and pressure loss to provide back pressure to the valve and reduce the possibility of cavitation.

Overall, the present invention 100 has improved flow characteristics and control characteristics as compared to similar arrangements in the prior art. Additionally, the present invention 100 yields a substantial cost savings to the user. This cost savings comes from the use of the fixed conical reducer 102, the flexible full port sleeve 112 and the reducing flange 118. In this manner, the present invention 100 provides a cost-effective pinch valve arrangement which is particularly adapted to large diameter pipe applications, e.g., 24 inches or more.

It will be evident to those of ordinary skill in the art that various changes and modifications may be made to the present invention without departing from the spirit and scope thereof. The specific embodiments described herein are intended to be illustrative of, and not restrictive of, the present invention. This invention has been described with reference to the preferred embodiments. Obvious modifications and alterations will occur to others upon reading and understanding the detailed description.

I claim:

1. A pinch valve for connection between an upstream pipeline and a downstream pipeline, comprising:
   a fixed conical reducer having an inlet end, an outlet end and an inside surface having an inside diameter which gradually reduces from the inlet end to the outlet end, resulting in a substantially conical-shaped inside surface, the inlet end of the fixed conical reducer attached to the upstream pipeline;
   a flexible full port sleeve having an inlet end and an outlet end, the inlet end of the flexible full port sleeve attached to the outlet end of the fixed conical reducer and the outlet end of the full port sleeve attached to the downstream pipeline;
   a pinching mechanism positioned adjacent the flexible full path port sleeve and for constricting the flexible full port sleeve; and,
   a reducing flange between the outlet end of the flexible full port sleeve and an inlet end of the downstream pipeline.

2. The pinch valve of claim 1, wherein the inside diameter of the reducing flange is equal to the inside diameter of the inlet end of the full port sleeve.

3. The pinch valve of claim 1, wherein the inside diameter of the reducing flange is less than the inside diameter of an inlet end of the downstream pipeline.

4. A pinch valve for connection between an upstream pipeline and a downstream pipeline, comprising:
   a fixed conical reducer having an inlet end, an outlet end and an inside surface having an inside diameter which gradually reduces from the inlet end to the outlet end, resulting in a substantially conical-shaped inside surface, the inlet end of the fixed conical reducer attached to the upstream pipeline;
   a flexible full port sleeve having an inlet end and an outlet end, the inlet end of the flexible full port sleeve attached to the outlet end of the fixed conical reducer and the outlet end of the full port sleeve attached to the downstream pipeline;
   a pinching mechanism positioned adjacent the flexible full port sleeve and for constricting the flexible full port sleeve; and,
   a reducing flange;
   wherein an inlet end of the downstream pipeline further comprises a downstream pipeline flange; wherein the reducing flange is configured to be attachable between the flexible full port sleeve outlet end and the downstream pipeline flange; and wherein the inside diameter of the reducing flange is less than the inside diameter of the downstream pipeline flange.

5. A pinch valve for connection between an upstream pipeline and a downstream pipeline, comprising:
   a fixed conical reducer having an inlet end, an outlet end and an inside surface having an inside diameter which gradually reduces from the inlet end to the outlet end, resulting in a substantially conical-shaped inside surface, the inlet end of the fixed conical reducer attached to the upstream pipeline;
   a flexible full port sleeve having an inlet end and an outlet end, the inlet end of the flexible full port sleeve attached to the outlet end of the fixed conical reducer and the outlet end of the full port sleeve attached to the downstream pipeline;
   a reducing flange; and
   a pinching mechanism positioned adjacent the flexible full port sleeve for constricting the flexible full port sleeve;
   wherein an outlet end of the upstream pipeline further comprises an upstream pipeline flange configured to be attachable to be fixed conical reducer inlet end;
   wherein an inlet end of the downstream pipeline further comprises a downstream pipeline flange;
   wherein the reducing flange is configured to be attachable between the flexible full port sleeve outlet end and the downstream pipeline flange;
   wherein the inside diameter of the reducing flange is less than the inside diameter of the downstream pipeline flange.

* * * * *

UNITED STATES PATENT AND TRADEMARK OFFICE
CERTIFICATE OF CORRECTION

PATENT NO. : 6,505,810 B2
DATED : January 14, 2003
INVENTOR(S) : Andre T. Abromaitis It is certified that error appears in the above-identified patent and that said Letters Patent is hereby corrected as shown below:

<u>Title page,</u>
Item [73], Assignee, insert -- Red Valve Company, Inc., Carnegie, PA --.

Signed and Sealed this

Twenty-second Day of July, 2003

JAMES E. ROGAN
*Director of the United States Patent and Trademark Office*